(12) United States Patent
Shaw et al.

(10) Patent No.: US 10,016,650 B2
(45) Date of Patent: Jul. 10, 2018

(54) SYSTEMS AND METHODS FOR TARGET TRAINING INCLUDING SYNCHRONIZED MUSIC

(71) Applicant: Excel Equipment LLC, Elk Grove, IL (US)

(72) Inventors: Marian Shaw, Centennial, CO (US); David Shaw, Centennial, CO (US)

(73) Assignee: Excel Equipment LLC, Elk Grove Village, IL (US)

( * ) Notice: Subject to any disclaimer, the term of this patent is extended or adjusted under 35 U.S.C. 154(b) by 500 days.

(21) Appl. No.: 14/175,742

(22) Filed: Feb. 7, 2014

(65) Prior Publication Data

US 2014/0228173 A1    Aug. 14, 2014

Related U.S. Application Data

(60) Provisional application No. 61/762,652, filed on Feb. 8, 2013.

(51) Int. Cl.
| | |
|---|---|
| A63B 24/00 | (2006.01) |
| A63B 69/34 | (2006.01) |
| A63B 69/32 | (2006.01) |
| A63B 22/00 | (2006.01) |
| A63B 71/06 | (2006.01) |
| G09B 19/00 | (2006.01) |

(52) U.S. Cl.
CPC .......... *A63B 22/00* (2013.01); *A63B 71/0622* (2013.01); *G09B 19/00* (2013.01); *A63B 2022/0092* (2013.01); *A63B 2207/02* (2013.01); *A63B 2225/20* (2013.01)

(58) Field of Classification Search
USPC .................................................. 482/1, 4, 8
See application file for complete search history.

(56) References Cited

U.S. PATENT DOCUMENTS

| | | | | |
|---|---|---|---|---|
| 5,271,627 | A * | 12/1993 | Russell | A63B 69/0053 |
| | | | | 273/440 |
| 2004/0217876 | A1* | 11/2004 | Blum | A47L 23/22 |
| | | | | 340/815.4 |
| 2005/0288159 | A1* | 12/2005 | Tackett | A63B 69/20 |
| | | | | 482/84 |
| 2006/0107822 | A1* | 5/2006 | Bowen | A63B 71/0686 |
| | | | | 84/612 |

(Continued)

OTHER PUBLICATIONS

Bolt et al.; "Comparison of Makoto Training to other Training Conditions: A Preliminary study of Makoto Benefits"; Dec. 2005; Calvin College, Grand Rapids, Michigan.

*Primary Examiner* — Andrew S Lo
*Assistant Examiner* — Shila Jalalzadeh Abyan
(74) *Attorney, Agent, or Firm* — AU LLC; Adam E. Urbanczyk

(57) ABSTRACT

Systems and methods for target training including synchronized music for providing training of a user, and the system includes an arena. The arena includes a plurality of towers, the towers located within the arena, the plurality of towers each having a plurality of lighted targets. The system includes a computing system, interconnected with the plurality of towers, the computing system configured to turn on and off the lighted targets, wherein the lighted targets are configured to be actuated by the touch of a user as well as the computing system.

8 Claims, 2 Drawing Sheets

(56) References Cited

U.S. PATENT DOCUMENTS

| | | | | |
|---|---|---|---|---|
| 2006/0291802 A1* | 12/2006 | Anthony | ............ | H04B 10/1143 |
| | | | | 386/230 |
| 2008/0311548 A1* | 12/2008 | Jiang | ........................ | G09B 7/02 |
| | | | | 434/201 |
| 2009/0088877 A1* | 4/2009 | Terauchi | .............. | G10H 1/0025 |
| | | | | 700/94 |
| 2014/0066267 A1* | 3/2014 | Solah | ..................... | A63B 69/34 |
| | | | | 482/83 |

* cited by examiner

SYSTEMS AND METHODS FOR TARGET
TRAINING INCLUDING SYNCHRONIZED
MUSIC

CROSS-REFERENCE TO RELATED APPLICATIONS

This application claims the benefit of U.S. Provisional Application No. 61/762,652 filed Feb. 8, 2013, which is incorporated by reference to the same extent as though fully contained herein.

BACKGROUND

Various systems exist that incorporate the use of automated systems to train and exercise the body, as well as providing feedback concerning the change of ability of the user. The reflexes and speed of a user are key to analyzing the overall physical, mental, and neuromuscular health of the user. Although some systems exist that target these characteristics, enhancements are needed to realize the potential of such a training system.

SUMMARY

In one embodiment of systems and methods for target training including synchronized music for providing training of a user, the system includes an arena. The arena includes a plurality of towers, the towers located within the area, the plurality of towers each having a plurality of lighted targets. The system includes a computing system, interconnected with the plurality of towers, the computing system configured to turn on and off the lighted targets, wherein the lighted targets are configured to be actuated by the touch of a user as well as the computing system. Optionally, the computing system is configured to turn the lighted targets on and off according to a pattern. In one configuration, the pattern is associated with a beat of a song. Optionally, the beat of the song is determined by analyzing a digital representation of the song by the computing system. In one alternative, the digital representation is a digital music file provided to the computing system. In another alternative, the computing system generates the digital representation based on signals detected by a microphone associated with the computing system. Optionally, the pattern is provided to the computing system from an external source. In one alternative, the external source is a remote server. Optionally, the computing system detects a first tone having a first frequency and amplitude and, after a first period of time, detects a second tone having the first frequency and amplitude and, after a second period of time, detects a third tone having a first frequency and amplitude; and based on the first and second period being the same, the period of the beat is set to the first period and a beat tone to the first frequency and amplitude, and the computing system subsequently actuates at least one of the plurality of lighted targets upon an occurrence of the beat tone. Optionally, a time it takes a user to actuate each lighted target of the plurality of lighted targets is recorded by the system. In one alternative, the time is used to calculate a score for the user representing a time taken by the user to actuate all of the lighted targets actuated by the computing system. Optionally, each of the plurality of lighted targets has an associated tone; and the computing system is configured to modify the associated tone. Alternatively, the computing system is configured to light lighted targets according to a presentation of a math problem, wherein one set of lighted targets represents a mathematical operation; and lighted targets are lighted according to providing a first number, the mathematical operation, and a second number, and wherein the user actuates a third number of lighted targets corresponding to the answer to the math problem and, responsive to the user providing the answer corresponding to a correct answer, the computing system provides an indication to the user. In one configuration, the pattern is a progressive pattern, the progressive pattern first presenting a sequence of one lighted target and, subsequent to a user actuating the correct lighted target previously presented, adding an additional lighted target to the sequence and repeating the adding of the additional lighted target each time the user actuates the previously presented sequence correctly. Optionally, the pattern is associated with sequences of at least two notes that reoccur in a song. Alternatively, the computing system monitors the song for the sequences of at least two notes by detecting the sequence of at least two notes at a first time in the song, detecting the sequence of at least two notes at a second time in the song, and setting the sequence of at least two notes to actuating sequences, wherein subsequently at least one of the plurality of lighted targets is actuated by the computing system upon the occurrence of the actuating sequence.

In another embodiment a method for determining a signal pattern for an interactive device includes receiving, at a computing system, a sound, the sound having a length and a pattern. The method further includes determining the pattern with the computing system. The method further includes synchronizing a signal pattern output by the computing device with the pattern. Optionally, the sound is a song. In one configuration, the signal pattern indicates when visual cues are to be lit. Optionally, the pattern is a beat and the beat of the song is determined by analyzing a digital representation of the song by the computing system. Alternatively, the digital representation is a digital music file provided to the computing system. In another alternative, the computing system generates the digital representation based on signals detected by a microphone associated with the computing system. Optionally, the pattern is provided to the computing system from an external source. Alternatively, the external source is a remote server. Optionally, the computing system detects a first tone having a first frequency and amplitude and, after a first period of time, detects a second tone having the first frequency and amplitude and, after a second period of time, detects a third tone having a first frequency and amplitude and based on the first and second period being the same; sets the period of the beat to the first period and a beat tone to the first frequency and amplitude; and the computing system subsequently actuates at least one of the plurality of lighted targets upon an occurrence of the beat tone.

DETAILED DESCRIPTION

Figure 1:
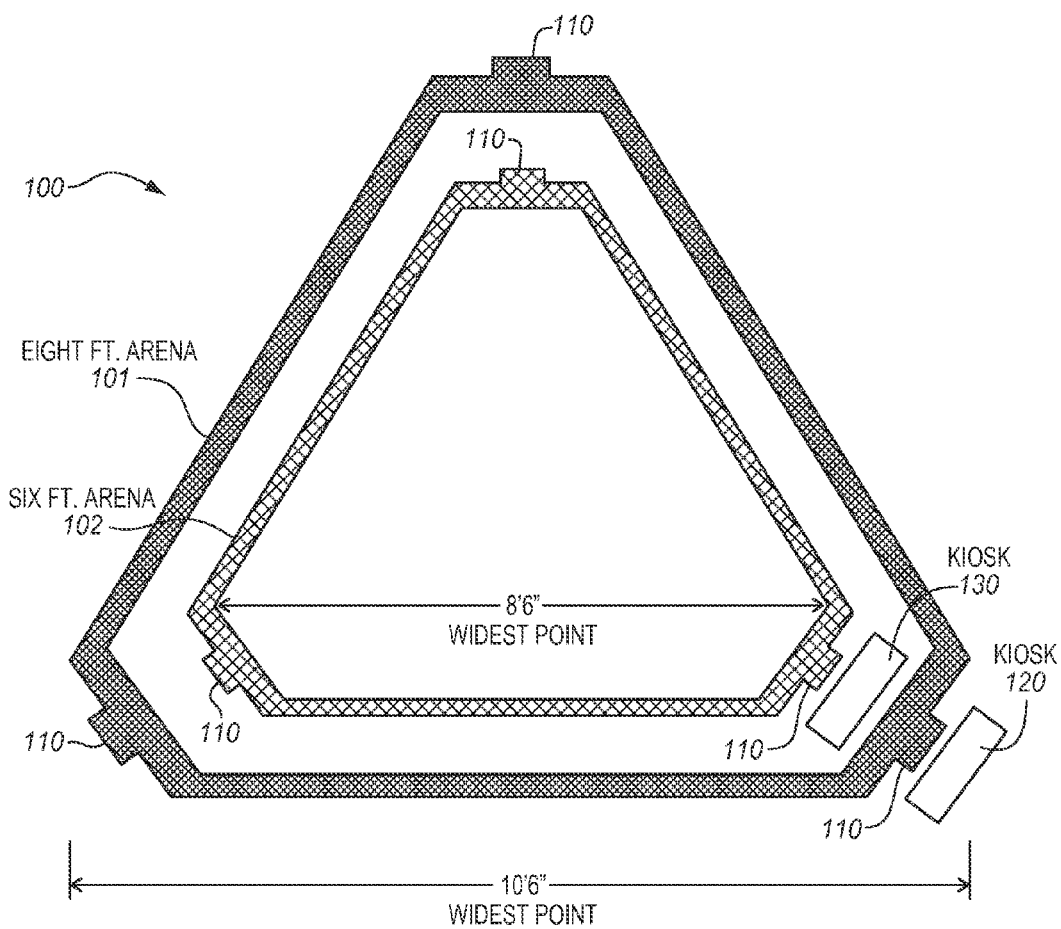
FIG. 1 shows one embodiment of an arena for use with Systems and methods for target training including synchronized music.
Figure 2C:
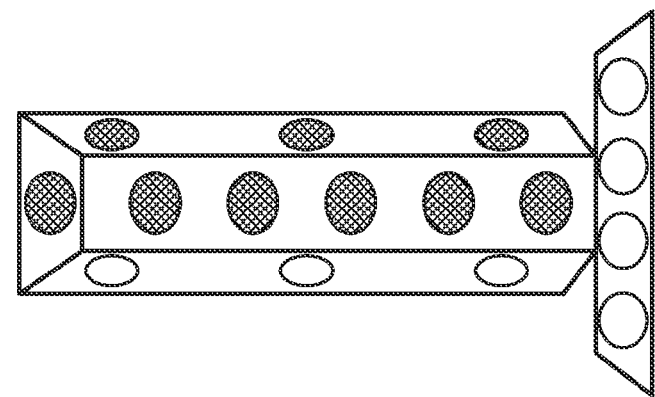
FIGS. 2a-2c shows an embodiment of a tower for use with the arena of FIG. 1.
Figure 2B:
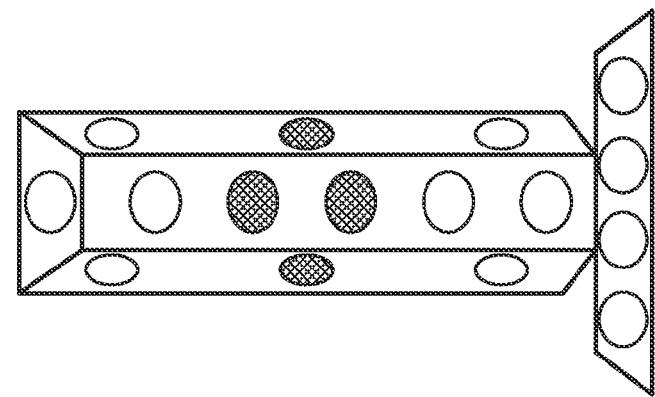
Figure 2A:
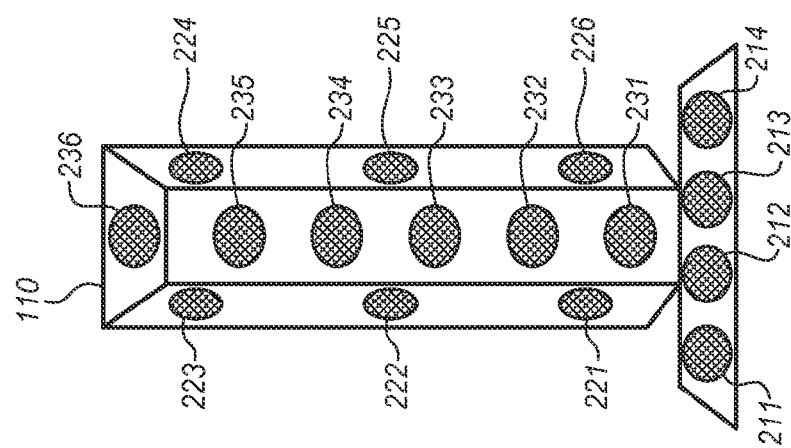

Various systems and methods are included in the Systems and methods for target training including synchronized music. An exemplary system 100 includes an area having either 8- or 6-foot triangular sides, 101, 102. Herein, this system is referred to as the "Arena." Although two particular configurations are discussed, multiple other configurations may be utilized, including different shapes and sizes of arenas. For instance, squares, hexagons, or other geometric shapes may be used as arena shapes. As shown in the schematic of FIG. 1, the exemplary Arena 101, 102 includes three towers 110. These towers include multiple targets that light up for the user to strike, either with their body or an implement. An example of such a tower is shown in FIGS. 2a-2c. An object of the game or training that the user engages in is to strike targets when they illuminate. The system may also include a kiosk 103, where a computing system 120 having a receiver 130 operates. The receiver 130 may receive music, either to be played through the computing system or through an external music system that does not pass through the computing system 120.

As shown in FIG. 2a, tower 110 includes a plurality of lighted targets. The tower 110 includes floor lighted targets 211, 212, 213, 214, side lighted targets 221, 222, 223, 224, 225, 226, front lighted targets 231, 232, 233, 234, 235, and top lighted target 236. The configuration of the tower 110 is merely exemplary, and different configurations of targets may be utilized.

As shown, various lighting configurations may be utilized for different games. For instance, as shown in FIG. 2a, all lights may be activated for targeting by a user. As shown in FIG. 2b, just the middle level targets 222, 225, 233, 234 may be activated. As shown in FIG. 2c just the middle, top, and one side of lighted targets 224, 225, 226, 231, 232, 233, 234, 235, 236 are activated. These are just a small number of the lighted configurations possible.

Various configurations of lighting may be utilized to target certain areas that require exercise or measurement. For instance, if the subject has issues with a shoulder, only high lighted targets may be lit, thus requiring the user to reach in an upward fashion to activate targets.

In addition to the arena 101, 102 and the towers 110, the system 100 includes a computing system. The computing system 120 may be installed as a permanent fixture as part of the system or may be a personal computer or other computing device provided by the user. In some embodiments, the computing system may have a receiver 130 for receiving communications from another computing device such as a smart phone or mp3 player that will provide a source of music to the computing system 120.

In some configurations, the computing device includes an input system such as a touch screen that allows the user to access specific programs and configurations stored in the device. Typically, the system 100 is controlled by software; and the software provides for functionality, customization, and control of the arenas and towers.

The software implemented on the system has numerous programs and configurations. In one configuration, the system allows for the user to provide music from an outside source and the lighting of the targets is synchronized with the outside source of music. At least two alternatives are possible for synchronizing the outside source of music with the lighting of lighted targets. In a first alternative, the music is provided from an outside source. The music is routed through the computing system 120. The computing system 120 implements software that delays the playing of the music through speakers associated with the system. The delay need only be momentary; long enough for the computing system to determine the rhythm of the incoming music. A beat in music typically is marked by wave forms of high amplitude.

The detection of the beat may be further broken down to recognize patterns in specific pitch regions of the music, typically referred to as high-, low-, and mid-frequency regions. These regions may be differently defined in alternatives; however, typically 500 hz is low frequency, anything between 500 hz and 2,000 hz to 4000 hz is mid frequency, and anything higher than the mid frequency is considered the high frequency. Typically in music, either the low or mid frequencies define the beat of the music. Therefore, by separating out the high-, low-, and mid-range frequencies of the music, the beat of the music may be more easily determined.

Therefore, in embodiments where the computing system 120 has direct access to the digital music file or other music input to be played, it may quickly scan either a portion of the music, or the entire music file to determine the beat of the piece of music. It may do so on a high-, mid-, low-frequency basis. The beat is framed by period repetition of a frequency at an amplitude higher than the surrounding area. The ability to scan an entire piece of music prior to the synchronization of the music and the lighting of the lighted targets is advantageous for synchronization, but not required. This may be referred to as internal pre-fed detection of beat patterns.

In an alternative, the computing system 120 may not directly receive a digital input of the piece of music played. Instead the system may "hear" or detect the music, using a microphone, and then convert the sound into a digitized representation of the piece of music. The computing system 120 divides the sounds into high-, low-, and mid-range sounds, recording their amplitude, frequency, and time-based occurrence. This may be referred to as ambient detection and beat patterning.

After detecting a small portion of the music, the computing system is able to determine the beat of the music. This is typically a period of three repetitions of the beat pattern. Therefore, in one alternative, the system detects a first high amplitude note of a first frequency in a mid-frequency range. A first period of time later, greater than a minimum period of time based on known beat periods, the system detects a second high amplitude note of the first frequency in a mid-frequency range. If after the second period of time the system detects a third high amplitude note of the first frequency in a mid-frequency range, then high amplitude notes having a similar amplitude to the first, second, and third note and having the same frequency are determined to be the beat notes. Thereafter, when beat notes occur, the system 100 activates various lighted targets according to the program employed. Optionally, if the beat meter of the song is known, it may be pre-fed into the system 100. The system then may operate knowing what the first and second periods of time should be.

In another alternative, the system 100 may be configured to learn the beats of certain songs, such that the second time the song is heard, no buffer for the detection of the beat is needed. In this case, the user indicates during the first playing of the song a name or other identifier for the song. Prior to the playing of the song for the second time, the user makes an indication using system 100 that the prior song will be played. Over time, a large database of training songs may be programmed into the system 100.

In one alternative, in addition to detecting a primary beat as described above, the system may continue the detection process identified above for other portions of the musical piece. Many musical pieces may have two or more beat schemes for different sections of the song. Therefore, the system may continue to detect patterns in the music when it detects a first high amplitude note of a second frequency in a mid-frequency (or other frequency) range. A third period of time later, greater than a minimum period of time based on known beat periods, the system detects a second high amplitude note of the second frequency in a mid-frequency range. If after a fourth period of time the system detects a third high amplitude note of the second frequency in a mid-frequency range, then high amplitude notes having a similar amplitude to the first, second, and third notes and having the same frequency (the second frequency) are determined to be the second set of beat notes. Therefore, when the second set of beat notes occur, the system 100 activates various lighted targets according to the program employed.

Note that beat notes may overlap in some pieces of music and, therefore, the first beat notes and activation of lighted targets accordingly and the second set of beat notes and the activation of lighted targets accordingly may overlap.

In an additional configuration, the system 100 may be designed to detect additional features of music, such as non-periodic complex melody schemes. As the music plays, the system 100 may record combinations of two or more notes. After a combination is recorded, the system will monitor for additional occurrences of the combination. If the combination occurs three times, then the system may begin to associate the activation of lighted targets with the note combination, either on the first, middle, last, or any note of the combination. This procedure tends to perform better with more complex note combinations of five or more notes; however, different defaults optionally may be set by the user. It also is not necessary for combinations to occur three times before association occurs, especially in cases of more complex note combinations.

In some embodiments, melody detection based on combinations of two or more notes may be enhanced by emphasizing combinations having slightly higher amplitude. Moreover, lighted targets may be preferentially activated upon the highest amplitude portions of note combinations. Optionally, this may be further optimized by activating according to the highest amplitude portions of note combinations when those portions are followed by an area of lower amplitude (volume) sound.

Although these procedures are discussed in relation to monitoring music provided by an ambient or outside source, they can be equally and more easily applied to digital or other source feed through the system. Also, in all cases, songs that are detected and patterned for beats or melodies previously may have beat and melody patterns pre-stored and associated with an identifier, typically the name of the song. This process may be referred to as "usage of predetermined beat patterns."

In another alternative, a remote database of song beat patterns may be developed and stored. Users may then access, by downloading from a remote database or transferring into the system 100, the beat pattern (or melody pattern). Of course, combinations of these schemes include ambient detection and beat patterning, internal pre-fed detection of beat patterns, and usage of predetermined beat patterns. The beat patterning techniques described herein may obviate the need to license music to operate the system.

In other configurations, lighted target activation may occur manually by the player setting the initial interval or by a preset variable interval program.

Since the system is designed to be a game in some embodiments, a scoring procedure may be utilized. Scoring procedures additionally may provide for easy-to-compare measures of user performance. The game measures intervals of target taps for consistency of interval (hitting to the beat). Players may be scored as to accuracy of intervals (and whether hitting too soon or too late). In one music game, all targets (or pre-defined target groups) are lit. As player hits targets, they go out. After all targets on a tower are hit out, they re-light.

The concept of rhythmicity involves mentally planning at what point in time the target will be hit. This improves executive motor planning function. There are also physical fitness benefits due to the stretching, lunging and other movements made by the player during the course of the game.

The system 100 may have applications as follows:
In an "Interactive Gym" area where "Dance, Dance, Revolution" (or similar) is also being used. Can utilize the music from the DDR game, which helps avoid cacophony in the gym.
Bar environment: similar to a mechanical bull, players could compete for best scores in Makoto while hitting lights to the music of the house band.
Gyms, workout facilities—players use headphones to workout.

In one embodiment, the system 100 may be configured to light lighted targets in a progressive pattern, and then the user will be asked to repeat the pattern. For instance, first a single lighted target may be lit and turned off. Then the user is to touch and light that target within a preset period of time, such as 5 seconds for example. If the user is successful, the first target will again light and turn off, and then a second lighted target will light and turn off. Then the user is to touch and light each target, in order, within a preset period of time, such as five seconds+two seconds for each additional target, for example. The process will continue until the pattern is completed by adding a number of additional targets or the user misses a target, either by not hitting the target within the allotted time period or not hitting targets in the correct order. The game encompasses as many as 48 targets among three towers and floor pods.

Scoring may be based on accuracy (the number of correct targets in a row).

Difficulty levels are comparable to current "Sudden Death" options where Beginners can miss four targets, and the game stops on the fifth missed target. Intermediate can miss two targets, the game stops on the third missed target, and advanced stops on the first missed target.

In another embodiment, the user may record their own program for usage. In this program, the lighted targets will light up and play their sound file when touched/activated. React+Record will allow for actual music to be recorded by benefit of the new Sound Schemes.

In some embodiments, particular sounds may be associated with either the lighting of a lighted target or a user touching a lighted target to put it out. The lighted targets employ what is referred to as the "Quad Tones."

The upper four lighted targets, 223, 224, 235, and 236, may have the highest tone. The middle four targets 222, 225, 233, and 234 may have the next highest tone. The lower four targets, 221, 226, 231, and 232, may have a lower tone. The floor targets 211, 212, 213, and 214 may have the lowest tone. The tower 110 includes floor lighted targets, 211, 212, 213, and 214; side lighted targets 221, 222, 223, 224, 225, and 226; front lighted targets 231, 232, 233, 234, 235; and top lighted target 236. The configuration of tower 110 is merely exemplary, and different configurations of targets may be utilized.

Sound Theme Options: Sounds can be associated to each of the individual targets.

Sound themes may be associated with a single sound to a zone of targets as above including the upper four zone targets, the middle four zone targets, the lower four zone targets and the floor pod targets.

Optional sound schemes can be:

| | | | |
|---|---|---|---|
| Farm animals (four tones) | Farm animals (12 tones) | Sci-Fi sounds (four tones) | Sci-Fi sounds (12 tones) |
| Sound effects (four tones) | Sound effects (12 tones) | Musical instruments (four) | Musical instruments (10) |
| Musical (12) | Musical (16) | Military training sounds (four) | Location - verbal |
| Multiplication tables | Addition instructions | Subtraction instructions | Division instructions |
| Foreign language | Movement instructions | Visual scanning commands | |

Improved retention of information is seen when gross motor movements are combined with the learning session. Therefore, individuals can learn math or other skills while playing a game.

In another configuration, a Multiplication, Addition, Division, or Subtraction sound theme is chosen for a math program running within the system 100. When target #4 goes off in the 3× Multiplication game, the verbal sound cue is "Three times four." The player provides a vocal response ("twelve") and then hits the target. The acknowledgement sound for the target plays the sound file with the correct answer.

In one configuration a number of the target would correspond to the sound file. To learn the 6 multiplication tables, for example, when target #4 lights up, the sound file would be "four times six." Player should respond with "24" before hitting and turning off target.

For additional brain boost add specific gross motor movements to perform. For example, for multiplication a player does a jumping jack before hitting target, for addition—player jumps with arms held straight out from sides (+), subtraction, deep knee bend with arms in front, etc.

Tower "sections" (top 9-12—targets 223, 224, 235, 236, middle 5-8—targets 222, 223, 225, 234, bottom 1-4—targets 221, 226, 231, 232) allow for learning in "blocks." Smaller, easier numbers in bottom section for younger children.

In one embodiment, the system may be used to teach Foreign Languages and include 36 sound files of discrete words (48 if using floor pods) and can help player improve foreign language vocabulary. Multiple sound theme "packs" would be for varying levels of vocabulary. (Beginner Spanish might include 5 packs for a total of 240 words.) When target lights, sound file of word/pause/translated word plays. Player must give correct translated word before hitting target. Other classmates/teacher ensure correctness of response. If player can't think of correct word, sound file plays translated word before "timing out." (Sound file examples: "mesa—(2-second pause)—table" [next target] "gato—(2-second pause)—cat.") Length of pause can be varied depending upon student level.

Other types of inquiries may be used as well, including but not limited to Capitals of the US/World, US Presidents, True/false questions, etc. With the true/false two targets light up when sound file question plays. Player hits "green" for "true" and "red" for "false."

In some embodiments, forced cross-midline training is utilized such as Left hand/right hand, Left foot/right foot. Sound files would be associated with targets so as to force cross midline motion. Targets on the left side of the tower would have sound files to use the right or left foot. Center targets would alternate left and right sound files.

Custom sound files/programs, can be developed to achieve unique training programs. (Instructions such as "do 3 jumping jacks", "go shoot basket", "run around outside of arena once", "REVERSE: 67113", "SPELL *ampersand*")

In some embodiments, alternate instruction may be used in a therapy room. Color/number cards are placed on wall around the room. Makoto target lights up and it's red. Player scans room for red card and follows instructions for that color. Subsequent instructions can be simple or complex depending upon age of player.

In another configuration, a "Playback" program a player is presented with a series of targets and then the player must repeat the pattern. In some configurations, one additional target is added to the sequence each time. The user may set the difficulty level and either play at a "Beginner" level where the user can miss 5 targets before the game ends, and "Intermediate" level where the user can miss 3 targets, and an "Advanced" level which ends with the first missed target.

In another alternative, a "Puppetmaster" program allows a coach/trainer or doctor/therapist to control which target will light up. It is, in essence, a simple "on/off" program. The computer touch screen displays iconic representations of the towers. The coach taps a target on screen to light up the corresponding target. See FIG. 2 for possible representations of the towers.

Another program includes a "Record Mode" which is a playback of targets hit by a player. This can be at the speed recorded or at a faster or slower speed. In this way a trainer or user may record a routine at one speed and play it back at faster or slower speeds for training purposes.

Another configuration includes a "Fill in the Blank" mode that allows for player to "move" colored targets to their appropriate colored tower. The mode is like a 3D video game in which the topmost targets light up, then "move" to the next lower level. Red targets need to be moved to Tower 1, Green targets to Tower 2 and Blue targets to Tower 3. To "move" a target, player double taps lit target, then moves to appropriate tower and taps desired ending location. Player scored on time and number of correctly moved targets.

Another configuration includes a missile launch mode that utilizes floorpods. Similar to "Fill in the Blank" in that targets light at the top and move down. Player must go and stomp on floor pod targets to shoot down the "descending" targets.

Improved brain function/development is seen with certain types of music. (I know there are studies on this—Mozart and other classical music).

One implementation of a music program includes lighting all of the targets. As player hits target, it turns off and records whether hit was on beat, early or late and by how much. A target may not be hit twice in succession. This simple game, using music that the player enjoys, employs the same executive motor planning.

In another embodiment a method for determining a signal pattern for an interactive device includes receiving, at a computing system, a sound, the sound having a length and a pattern. The method further includes determining the pattern with the computing system. The method further includes synchronizing a signal pattern output by the computing device with the pattern. This method (and other methods) may be implemented in a system configured to perform the method described and may by a computer running code for executing the methods described. Optionally, the sound is a song. In one configuration, the signal pattern indicates when visual cues are to be lit. Optionally, the pattern is a beat and the beat of the song is determined by analyzing a digital representation of the song by the computing system. Alternatively, the digital representation is a digital music file provided to the computing system. In another alternative, the computing system generates the digital representation based on signals detected by a microphone associated with the computing system. Optionally, the pattern is provided to the computing system from an external source. Alternatively, the external source is a remote server. Optionally, the computing system detects a first tone having a first frequency and amplitude and, after a first period of time, detects a second tone having the first frequency and amplitude and, after a second period of time, detects a third tone having a first frequency and amplitude and based on the first and second period being the same; sets the period of the beat to the first period and a beat tone to the first frequency and amplitude; and the computing system subsequently actuates at least one of the plurality of lighted targets upon an occurrence of the beat tone.

Various embodiments of systems and methods for determining a signal pattern for an interactive device as well as the other systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as, but not limited to, read only memory (ROM); random access memory (RAM); magnetic disk storage media; optical storage media; a flash memory, etc.

In addition to a computing system configured to determine a signal pattern for an interactive device receiving signals via a microphone, the system may receive signals via a variety of interfaces such as WiFi, Bluetooth, and other transmission mediums. In some embodiments a computing device such a smart phone, tablet, or other computer may interface with computing system configured to determine a signal pattern for an interactive device, via WiFi or Bluetooth or other communication medium. The computing system configured to determine a signal pattern for an interactive device may then run an associated system that creates other visual and audio indications based on the signal pattern received.

A variation includes using the Upper section of targets to direct player to next "active" tower. If topmost target is lit (target #1—target 236—see "Target Location ID" which is different than Math ID), then the same tower will be active next. If target #2 (top left—target 223) is lit, then the next active tower will be to the left. Target #3—target 224—will indicate the tower to the right. Every tower will show a different directional light.

In this variation, targets will light early—ahead of the beat—and go through a color change becoming red at the exact time of the "beat" interval and fade to blue.

In an alternative, programming plays sound file associated with target. Imagine targets in Arena as piano keys. When player taps target, arena plays musical note for that location. 36/48 notes are available for sound files.

Although many of the methodologies and system described above relate to the arena and tower system described, they may be applied to other systems, whether tower and arena based or not. This includes, but is not limited to, other type of game, learning, and entertainment systems.

The previous detailed description is of a small number of embodiments for implementing the Systems and methods for target training including synchronized music and is not intended to be limiting in scope. The following claims set forth a number of the embodiments of the Systems and methods for target training including synchronized music disclosed with greater particularity.

What is claimed:

1. A system for providing training to a user, the system comprising:
    an arena;
    a plurality of towers, the towers located within the arena, the plurality of towers each having a plurality of lighted targets; and
    a computing system interconnected with the plurality of towers, wherein the plurality of lighted targets are configured to be actuated by the computing system as well as a strike of a user, the computing system is configured to actuate the lighted targets by turning the lighted targets on and off according to a first pattern of a plurality of patterns, the first pattern being associated with a beat of a song, the beat of the song having a period, the period being determined by analyzing a digital representation of the song by the computing system;
    wherein the computing system is configured to detect a first tone having a first frequency and amplitude, and after a first period of time, detect a second tone having the first frequency and amplitude, and after a second period of time, detect a third tone having the first frequency and amplitude, and based on the first and second periods being the same, set the period of the beat to the first period and a tone of the beat to the first frequency and amplitude, and subsequently actuate at least one of the plurality of lighted targets upon an occurrence of the beat tone; and
    wherein the computing system generates the digital representation based on signals detected by a microphone associated with the computing system.

2. The system of claim 1, wherein the computing system is further configured to actuate the lighted targets according to a second pattern of the plurality of patterns, the second pattern associated with a presentation of a math problem, wherein one set of the lighted targets represents a mathematical operation, and the lighted targets are actuated, by the computing system, to provide a first number, the mathematical operation, and a second number; and wherein the user strikes the lighted targets providing a third number corresponding to an answer to the math problem and, responsive to the answer being a correct answer, the computing system provides an indication to the user.

3. The system of claim 1, wherein the computing system is further configured to actuate the lighted targets according to a third pattern of the plurality of patterns, the third pattern being a progressive pattern, the progressive pattern presenting a sequence in which at first, a single lighted target, actuated by the computing system, is presented to the user for striking within a preset period of time, subsequent to the user striking the correct lighted target within the preset period of time, another lighted target, actuated by the computing system, is added to the sequence and presented to the user, wherein the addition of additional lighted targets to the sequence, is repeated each time the user strikes the lighted targets of the previously presented sequence, correctly within the preset period of time.

4. The system of claim 1, wherein the computing system is further configured to actuate the lighted targets according to a fourth pattern of the plurality of patterns, the fourth pattern being associated with sequences of at least two notes that reoccur in a song.

5. The system of claim 4, wherein the computing system monitors the song for the sequences of the at least two notes by detecting the sequence of the at least two notes at a first time in the song, detecting the sequence of the at least two notes at a second time in the song, and setting the sequence of at least two notes as an actuating sequence; wherein at least one of the plurality of lighted targets is subsequently actuated by the computing system upon occurrence of the actuating sequence.

6. A system for providing training to a user, the system comprising:
   an arena:
   a plurality of towers, the towers located within the arena, the plurality of towers each having a plurality of lighted targets: and
   a computing system interconnected with the plurality of towers, wherein the plurality of lighted targets are configured to be actuated by the computing system as well as a strike of a user, the computing system is configured to actuate the lighted target by turning the lighted targets on and off according to a first pattern of a plurality of patterns, the first pattern being associated with a beat of a song, the beat of the song having a period, the period being determined by analyzing a digital representation of the song by the computing system;
   wherein the computing system is configured to detect a first tone having a first frequency and amplitude, and after a first period of time, detect a second tone having the first frequency and amplitude, and after a second period of time, detect a third tone having the first frequency and amplitude, and based on the first and second periods being the same, set the period of the beat to the first period and a tone of the beat to the first frequency and amplitude, and subsequently actuate at least one of the plurality of lighted targets upon an occurrence of the beat tone;
   wherein a time it takes the user to strike each lighted target of the plurality of lighted targets, already actuated by the computing system according to the first pattern, is recorded by the computing system;
   wherein the recorded time is used to calculate a score of the user, the score representing a time taken by the user to strike all of the lighted targets of the plurality of lighted targets, already actuated by the computing system according to the first pattern;
   wherein the plurality of lighted targets have upper lighted targets, middle lighted targets, lower lighted targets and floor lighted targets;
   wherein the upper lighted targets have an associated highest tone, the middle lighted targets have an associated next highest tone, the lower lighted targets have an associated lower tone and the floor lighted targets have an associated lowest tone; and
   the computing system is configured to modify the associated highest, the associated next highest, the associated lower and the associated lowest tones.

7. The system of claim 6, wherein the first frequency is in a mid-frequency range.

8. The system of claim 7, wherein the mid-frequency range lies between 500 Hz to 4000 Hz.

* * * * *